United States Patent [19]

Deardurff et al.

[11] Patent Number: 5,573,143
[45] Date of Patent: Nov. 12, 1996

[54] BLOW MOLDED MULTI-CHAMBER CONTAINERS WITH DISPENSER/DOSER

[75] Inventors: Lawrence R. Deardurff, Waterville; Daniel J. Durham, Toledo, both of Ohio; Adam Sherman, Brooklyn, N.Y.; Salvatore N. Del'Re, Marlboro; James C. McKinney, Cranbury, both of N.J.

[73] Assignee: Colgate-Palmolive Company, New York, N.Y.

[21] Appl. No.: 310,557

[22] Filed: Sep. 21, 1994

[51] Int. Cl.⁶ .................................................. B67B 5/00
[52] U.S. Cl. .................... 222/153.14; 222/205; 222/129
[58] Field of Search ............................. 222/153.14, 129, 222/205, 212

[56] References Cited

U.S. PATENT DOCUMENTS

| | | | |
|---|---|---|---|
| 2,559,446 | 6/1952 | Greene | 222/205 |
| 2,876,935 | 3/1959 | Lindberg | 222/145 |
| 2,918,698 | 12/1959 | Hagen et al. | 18/5 |
| 3,076,573 | 2/1963 | Thomas | 215/6 |
| 3,089,623 | 5/1963 | Padzieski | 222/205 |
| 3,141,574 | 7/1964 | Donoghue | 222/157 |
| 3,246,807 | 4/1966 | Micallef | 222/207 |
| 3,347,420 | 10/1967 | Donoghue | 222/129 |
| 3,474,927 | 10/1969 | Bowles | 215/1 |
| 3,581,940 | 6/1971 | Cella | 222/94 |
| 3,581,953 | 6/1971 | Donoghue | 222/207 |
| 3,729,553 | 4/1973 | Gold et al. | 424/44 |
| 3,767,088 | 10/1973 | Deussen | 222/205 |
| 3,892,326 | 7/1975 | Schneible | 222/153.14 |
| 3,900,123 | 8/1975 | Darlington | 222/153.14 |
| 4,065,536 | 12/1977 | Lucas | 264/98 |
| 4,070,140 | 1/1978 | Lucas et al. | 425/533 |
| 4,077,547 | 3/1978 | Donoghue | 222/207 |
| 4,217,328 | 8/1980 | Cambio, Jr. | 264/504 |
| 4,279,349 | 7/1981 | Aigner | 215/6 |
| 4,625,897 | 12/1986 | Wortley | 222/205 |
| 4,971,226 | 11/1990 | Donoghue | 222/207 |
| 5,024,340 | 6/1991 | Alberghini et al. | 215/1 C |
| 5,119,971 | 6/1992 | Reyman | 222/129 |
| 5,232,108 | 8/1993 | Nakamura | 216/6 |
| 5,242,066 | 9/1993 | Kelsey | 215/1 C |

FOREIGN PATENT DOCUMENTS

| | | |
|---|---|---|
| 1341631 | 9/1963 | France . |
| 2430791 | 7/1978 | France . |
| 3003120 | 7/1981 | Germany . |
| 3741086 | 3/1989 | Germany . |
| 4738064 | 3/1968 | Japan . |
| 59-253345 | 8/1984 | Japan . |
| 280390 | 6/1987 | Japan . |
| 223439 | 3/1990 | Japan . |
| 3-236932 | 10/1991 | Japan . |
| 1486416 | 6/1989 | U.S.S.R. . |
| 873955 | 8/1961 | United Kingdom . |
| 2067517 | 7/1981 | United Kingdom . |

*Primary Examiner*—Gregory L. Huson
*Attorney, Agent, or Firm*—James M. Serafino; Michael J. McGreal

[57] ABSTRACT

Multi-chamber containers with a dispenser/doser portion are blow molded as a single integral piece. Each chamber can then be fitted with dip tubes with a dip tube fitment forming a seal in the transition of the container body to the dispenser/doser portion. The dividing webs in the container which form the container into multiple chambers are continued up into and through the dispenser/doser portion. The webs of the container body are of a thickness so that they flex upon a compression force being applied to the container walls. This compression force flows liquid in each chamber of the container body up through the dip tubes and into the dispenser/doser portion.

19 Claims, 10 Drawing Sheets

BLOW MOLDED MULTI-CHAMBER CONTAINERS WITH DISPENSER/DOSER

FIELD OF THE INVENTION

This invention relates to blow molded multi-chamber dispensing containers, the methods for blow molding multi-chamber dispensing containers, and molds for use in making preforms and for blow molding multi-chamber dispensing containers. More particularly this invention relates to multi-chamber containers which have an elliptical cross-section and where in dispensing the substances are kept separate through the point of flowing into a receptacle.

Multi-chamber containers are of two general types. A first type is where the chambers are separate containers which then are interfitted together or held together with a shrink band. A multi-chamber container of this type is disclosed in U.S. Pat. No. 5,158,191. This patent shows two bottles held together with an interfitting arrangement. Whether the bottles are interfitted together or held together with a shrink band there is a lack of stability. There always will be some inter-container movement. A preferred container is one that has multiple chambers as a part of its basic structure. The most effective way to make such containers is by blow molding. However it is difficult to produce multi-chambered containers by blow molding. Techniques for blow molding multi-chamber containers are disclosed in Japanese Application No. 11430/1968, as well as in U.S. Pat. No. 5,232,108 and U.S. Pat. No. 5,242,066. Japanese Application No. 11430/1968 discloses injection molding a preform having a center wall and then blowing this preform to a container with two compartments. This container can be round or elliptical. U.S. Pat. No. 5,232,108 discloses a round multi-chamber container which has been blown from a preform that has multiple chambers. This patent discloses a technique for maintaining the integrity of the center wall during the blow molding phase. U.S. Pat. No. 5,242,066 discloses plastic bottles that have internal reinforcing spiders or webs. The objective in this patent is to reinforce the wall of a bottle that is to contain a carbonated beverage. These spiders or webs usually will not extend fully from the bottom of the bottle to the bottle exit since there is no need to keep the liquid portions separate. The liquid throughout the bottle is the same.

The preferred multi-chamber container is one that is made in one piece and that is of an integral structure. The container costs less to make and to fill. It also has more structural integrity. However, it is difficult to blow mold multi-chamber containers, and in particular multi-chamber containers which have other than a round shape. Also it is difficult to blow mold a multi-chamber container which includes an integral dispensing arrangement where the fluids from each chamber of the containers do not mix until flowed from the container into a receptacle.

The present invention overcomes the problems of the prior art and discloses multi-chamber dispensing and dosing containers that are of an integral structure. These containers are blow-molded from an injected preform with assembly only including the insertion of delivery dip tube fitments and providing a closure. This multi-chamber container is easily filled and has full structural integrity during storage, handling and use.

BRIEF SUMMARY OF THE INVENTION

The present invention is directed to multi-chamber dispensing and dosing containers which are of an integral one-piece construction. The multi-chamber container is blow molded having separate multiple chambers which are separate from the base of the container through the dispensing and dosing section. The container is preferably elliptical and the webs which form the chamber dividing walls have a decreased thickness in the central region of the web. The dispensing and dosing arrangement is an integral part of the container structure with the dosing and dispensing portion being divided into separate chambers, the same as in the container. The webs that form the separating walls in the container are continued into and throughout the dispenser/doser region to maintain the chambers separate throughout the container and dispenser/doser.

The chamber forming web must flex when the bottle side walls are compressed. This flexing will be at a center region of each web where it is at its decreased thickness.

A closure for the container is threadedly engaged onto the dispenser/doser portion. The part of the closure which contacts the top surfaces of the dispenser/doser, which includes the edge of the chamber forming webs, should preferably be rotatable with respect to the closure. In this way the seal surface in the closure will not be damaged upon contact with the web edges.

The container includes dip tubes which are seated in the transition of the containment portion of the container to the dispenser/doser portion. There is a dip tube for each chamber. The lower end of each dip tube is irregular, and preferably V-shaped.

The preform to produce the multi-chamber containers will have a web structure that is to be the web structure of the multi-chamber bottle. The preform is injection molded. The mold core is comprised of three sections for increased stability. There is the core base section and two core projections. The base section holds the core projections that form the multiple chambers. At a lower end of the core projections there preferably are recesses to enhance the flow of plastic with a complementary gate pad. The gate pad of the injection mold is of an elongated shape to further enhance the flow of plastic and to prevent core projection deflection during molding.

It is preferred that the container and consequently the blow mold have vertically oriented discontinuities in order to promote the expansion during preform blowing only in a vertical and a horizontal direction with no angular movement of the plastic during blowing. This will maintain the chamber web walls in a vertical orientation.

DETAILED DESCRIPTION OF THE INVENTION

Figure 1:
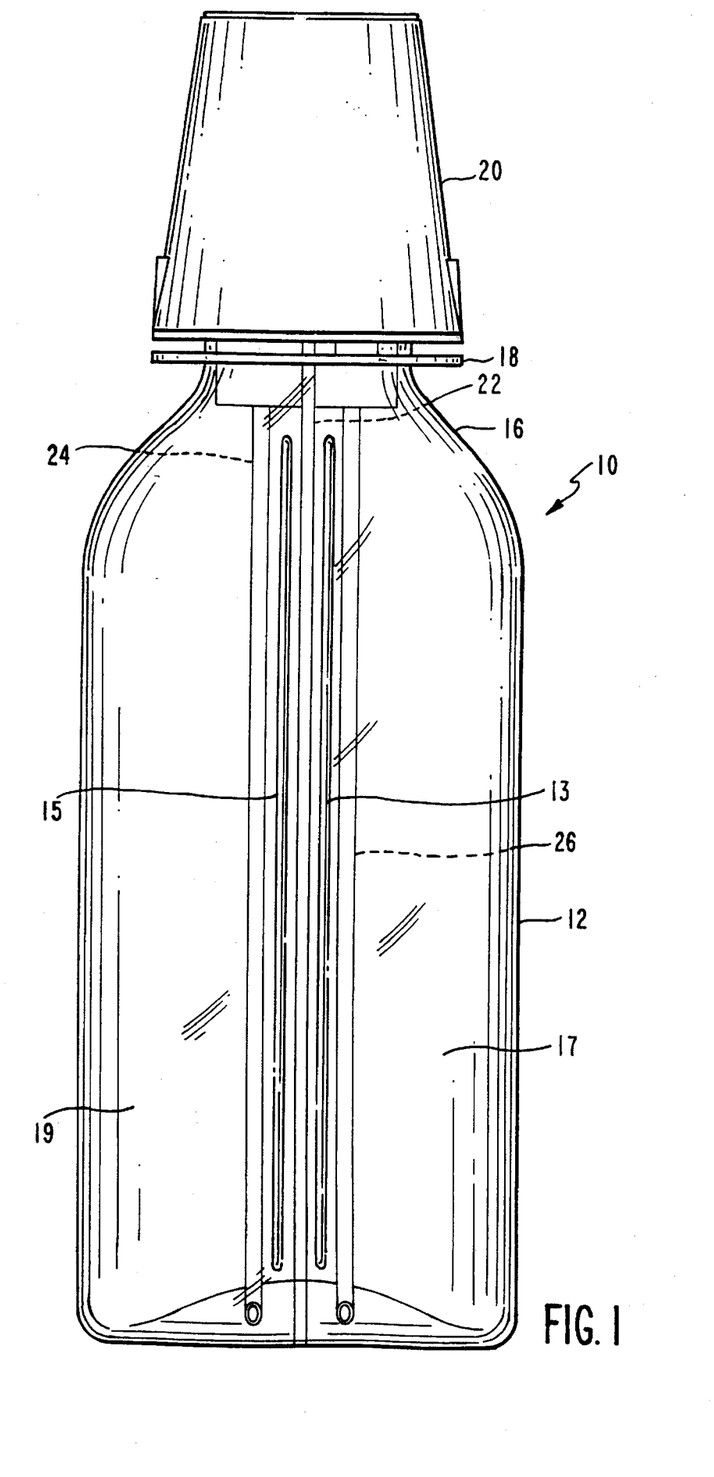
FIG. 1 is an elevational view of the container with a closure.

The present container is shown in FIG. 1. Container 10 has sidewall 12, base 14 and sidewall shoulder area 16. Within the container is web 22 which separates the container into two chambers. The web has a minimum thickness in the central region, that is, a region equidistant from the sidewalls. This will be a thickness of less than about 0.4 mm, and preferably less than 0.2 mm. Each chamber has a dip tube 24, 26 extending from the sidewall shoulder to near the base. On the surface of the bottle is a vertical projection 15 and a vertical recess 13. These are ornamental in the end product bottle but are used to stabilize the plastic material distribution after contact with the mold during blow molding.

At the upper end of the bottle is locking ring 18 and closure 20.

Figure 2:
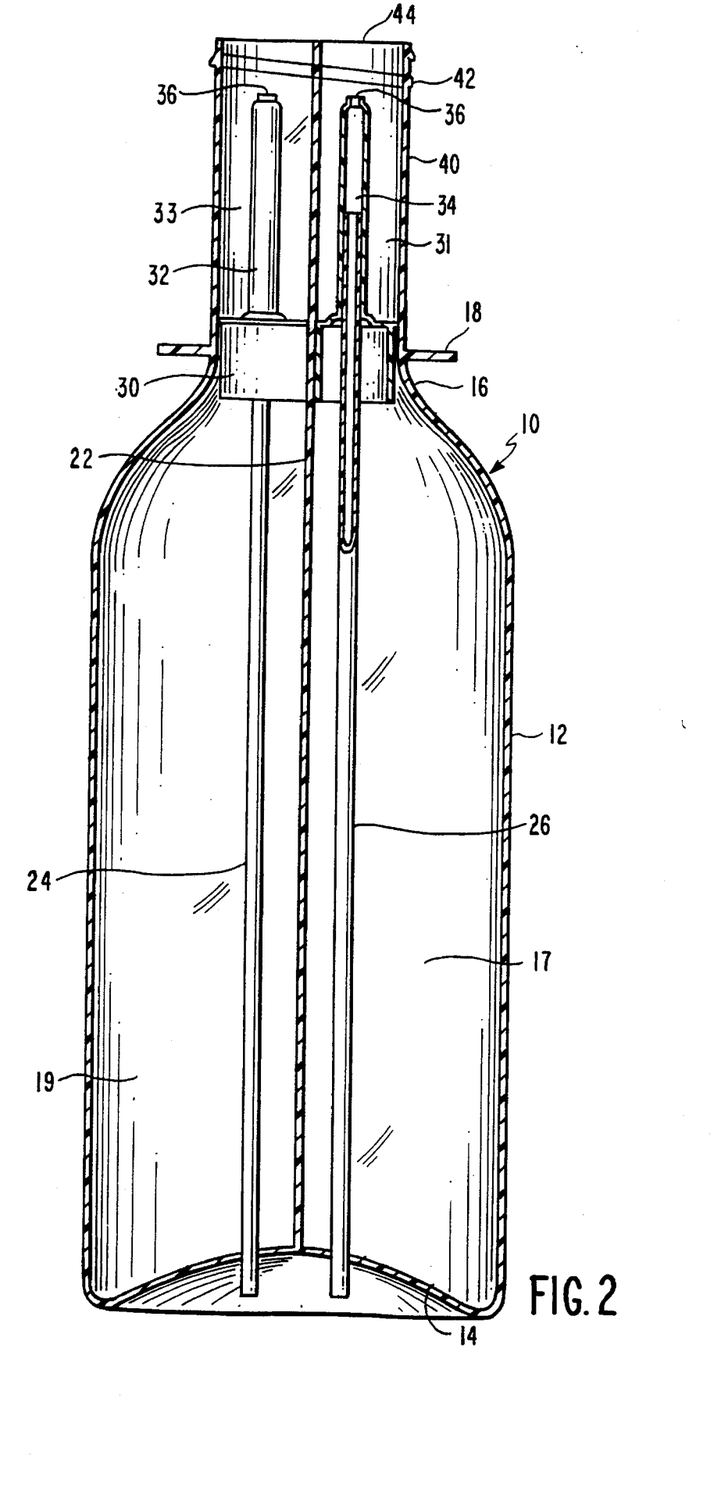
FIG. 2 is a horizontal sectional view of the container of FIG. 1 without the closure.

This bottle is shown in cross-section and without the closure in FIG. 2. It is shown that each of dip tubes 24 and 26 are connected into fitment 30 which also seals upper dispensing/doser chambers 31, 33 from the lower containment chambers 17, 19. Extending up from fitment 30 are dip tube extensions 32 and 34. Each of these dip tube extensions has an opening 36. The dispensing/doser chambers are formed by web 22 and wall 40. The exit of the dispenser/doser section in aperture 44. Threads 42 attach the closure to the container. The web 22 extends from the base of the bottle to the dispenser/doser exit 44.

Figure 3:
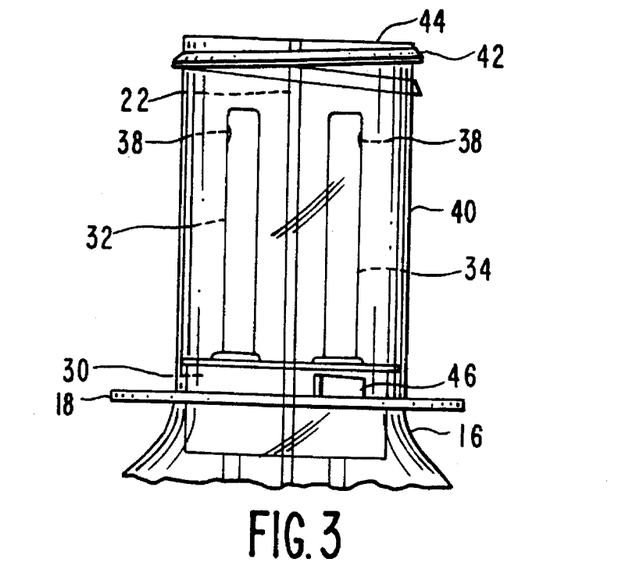
FIG. 3 is a elevational view of the dispenser/doser parts of the container of FIG. 2 showing side delivery from the dip tubes.
Figure 4:
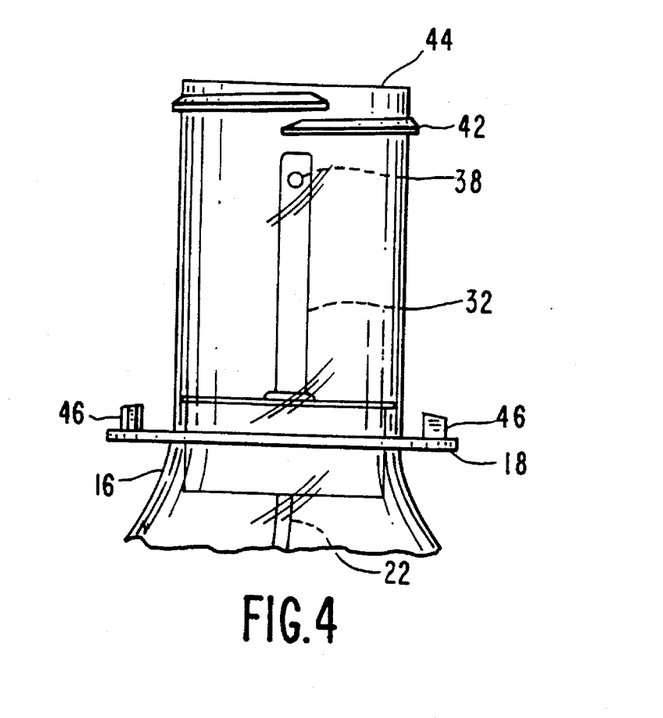
FIG. 4 is an elevational view of the dispenser/doser part of the container of FIG. 3 rotated 90 degrees.

FIG. 3 shows the top dispensing/doser section of the container. In this embodiment dip tube extensions 32 and 34 have side openings 38 for dispensing product. Lugs 46 (see also FIG. 4) are locking lugs that are used to hold the closure securely in place. In FIG. 4 the discharge openings 38 are shown in more detail.

Figure 5:
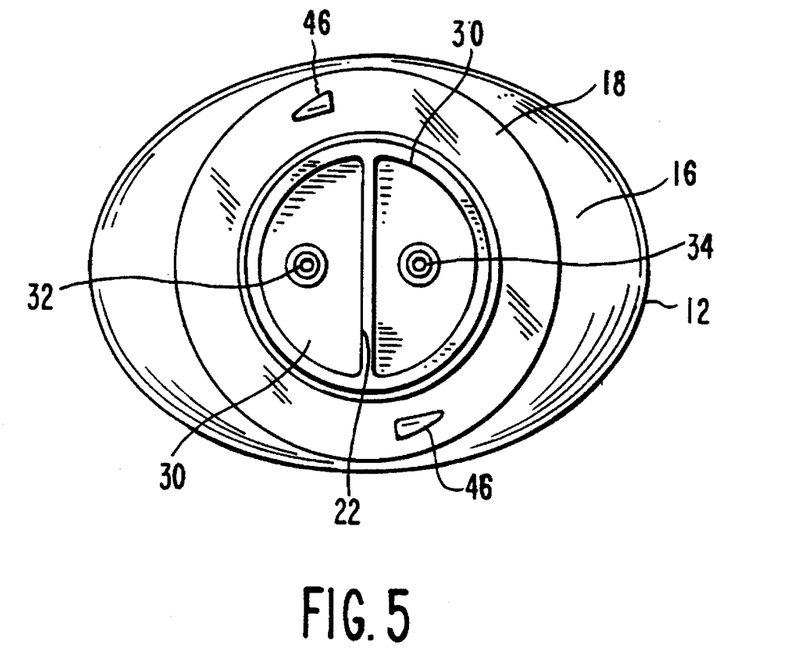
FIG. 5 is a top plan view of the container of FIG. 2.

FIG. 5 is a top plan view of the container showing the D-shaped fitments that hold the dip tube extensions and also which seal the dip tubes in the shoulder of bottle 10.

Figure 6:
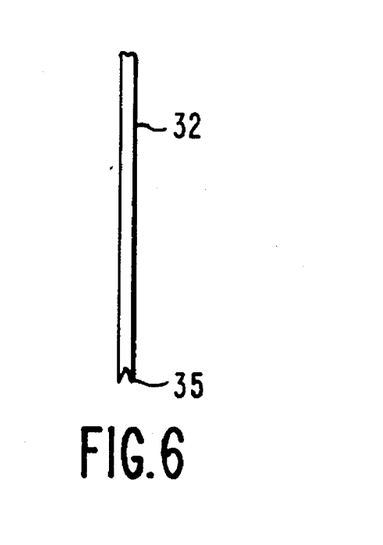
FIG. 6 is a view of the bottom of a dip tube.

FIG. 6 shows the end of a dip tube with a V-shape 35. This shape will permit a flow of liquid up the dip tube regardless of the contact of the dip tube with the sidewall or base of the container.

Figure 7:
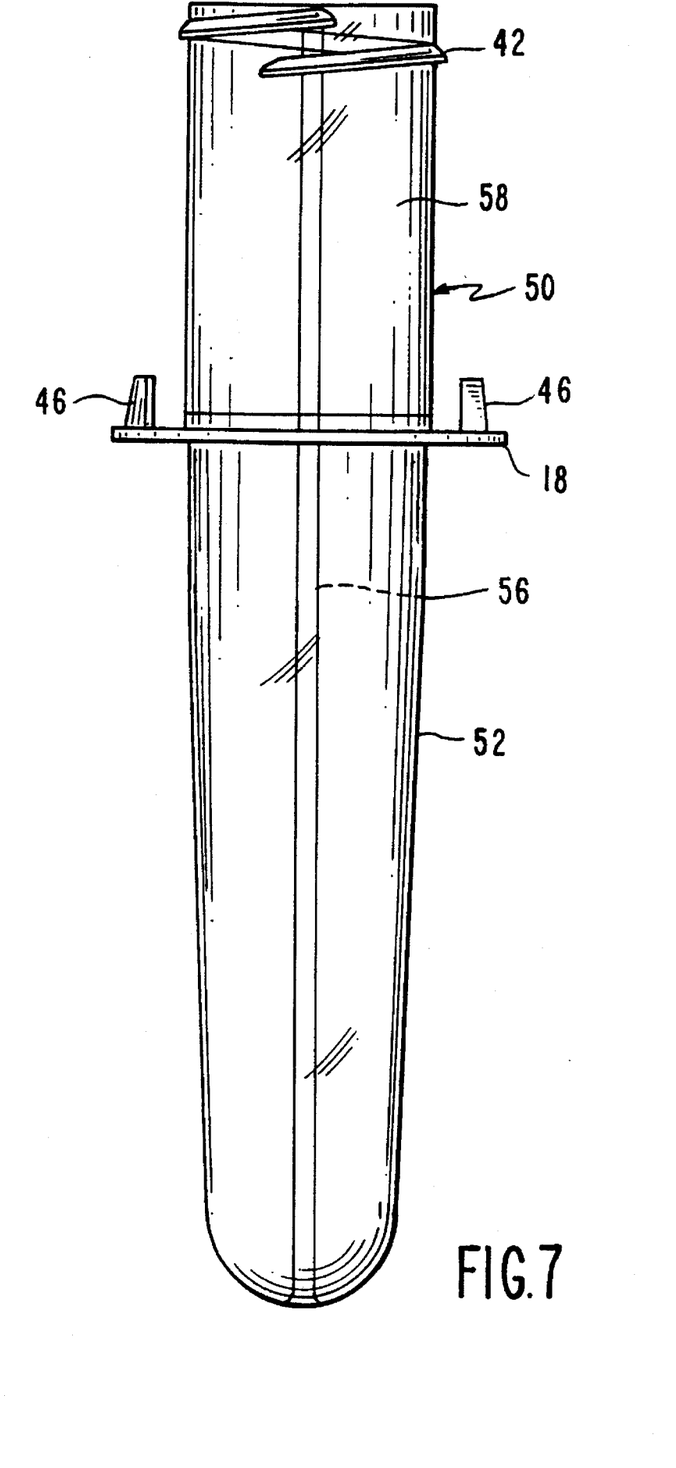
FIG. 7 is an elevational view of the container preform.

FIG. 7 discloses a preform for making the container of FIG. 1. This preform consists of a plastic tube 50 having a sidewall 52 and an inner wall 56. Wall 58 will be the outer wall of the dispenser/doser and of the blown container. In blowing the container the lugs 46 or the inner wall 56 can be used to align the preform in the mold. Alignment is important. For an elliptical bottle the blow mold will be elliptical in shape. The preform will be placed in the mold in different orientations to produce a blown bottle with a web along the major axis, along the minor axis or at an angle to the major axis or minor axis. Since in injection molding the preform the lugs 46 and the center wall 56 will always be in the same locations these are useful for reference points in aligning the preform in the blow mold.

Figures 8, 9:
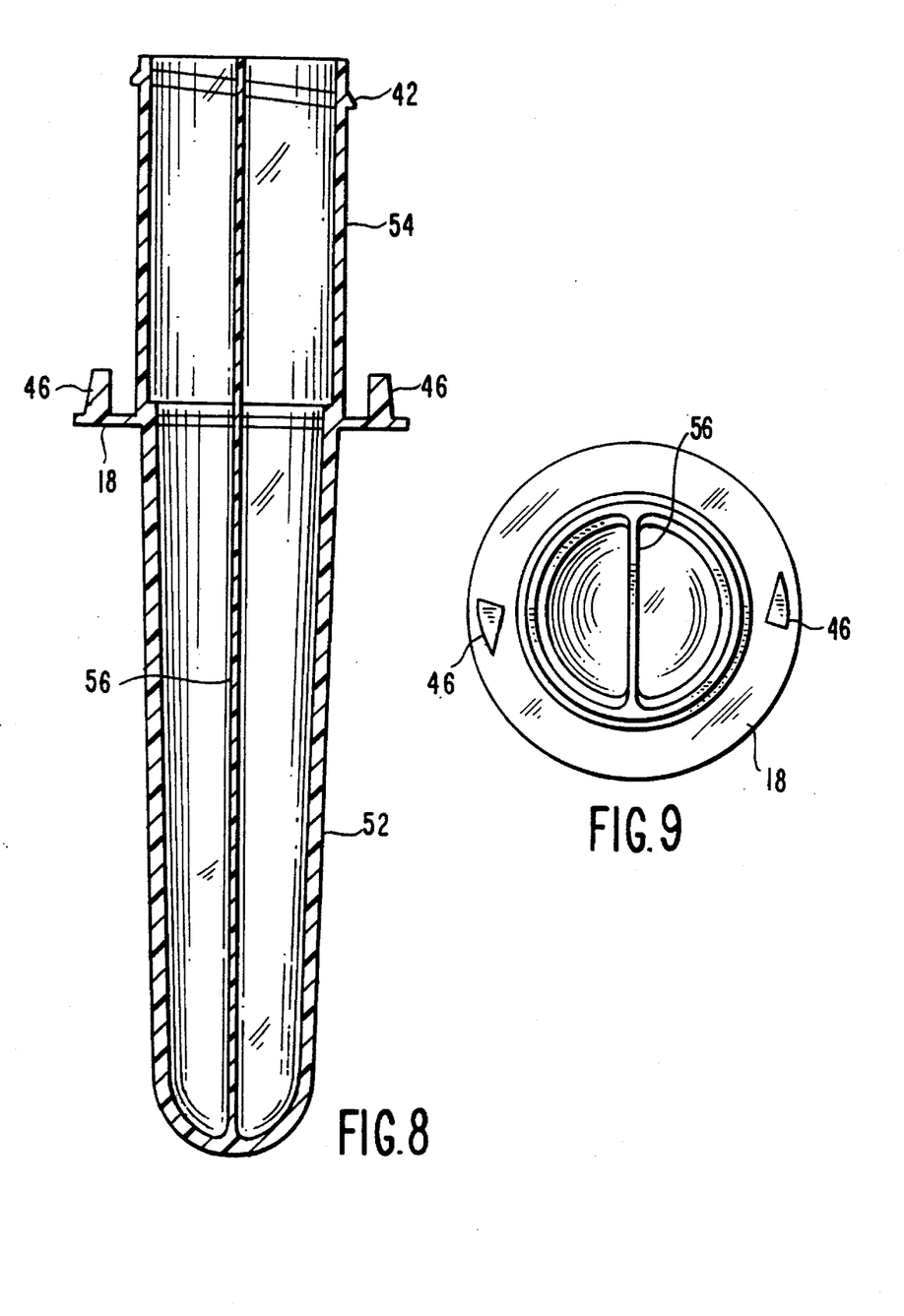
FIG. 8 is an elevational view of the preform of FIG. 7 in a horizontal section.
FIG. 9 is a top plan view of the preform of FIG. 7.

FIG. 8 is an horizontal section of the preform of FIG. 7.
FIG. 9 is a top plan view of the preform.

Figure 10:
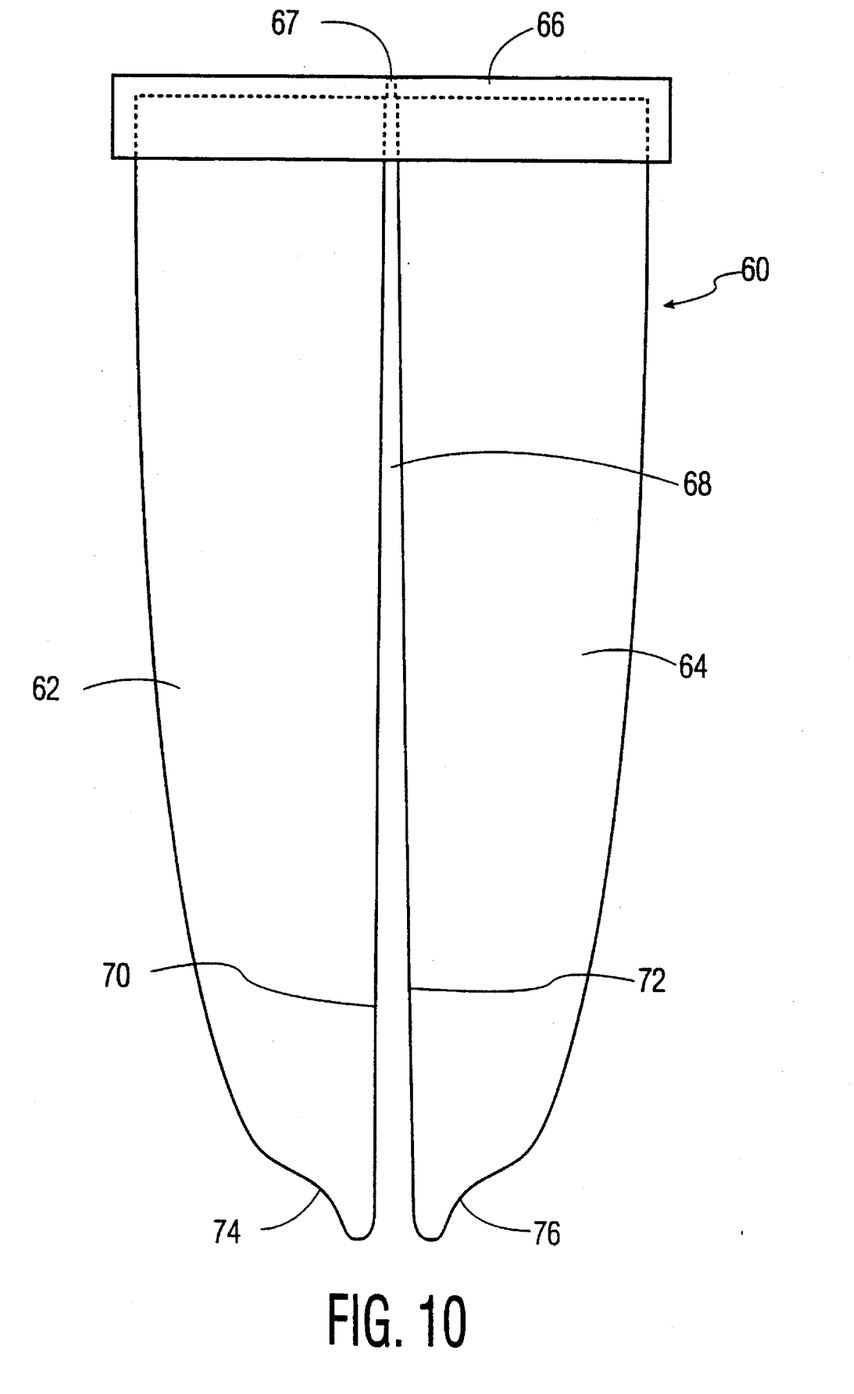
FIG. 10 is an elevational view of the core of the mold for the preform.
Figure 11:
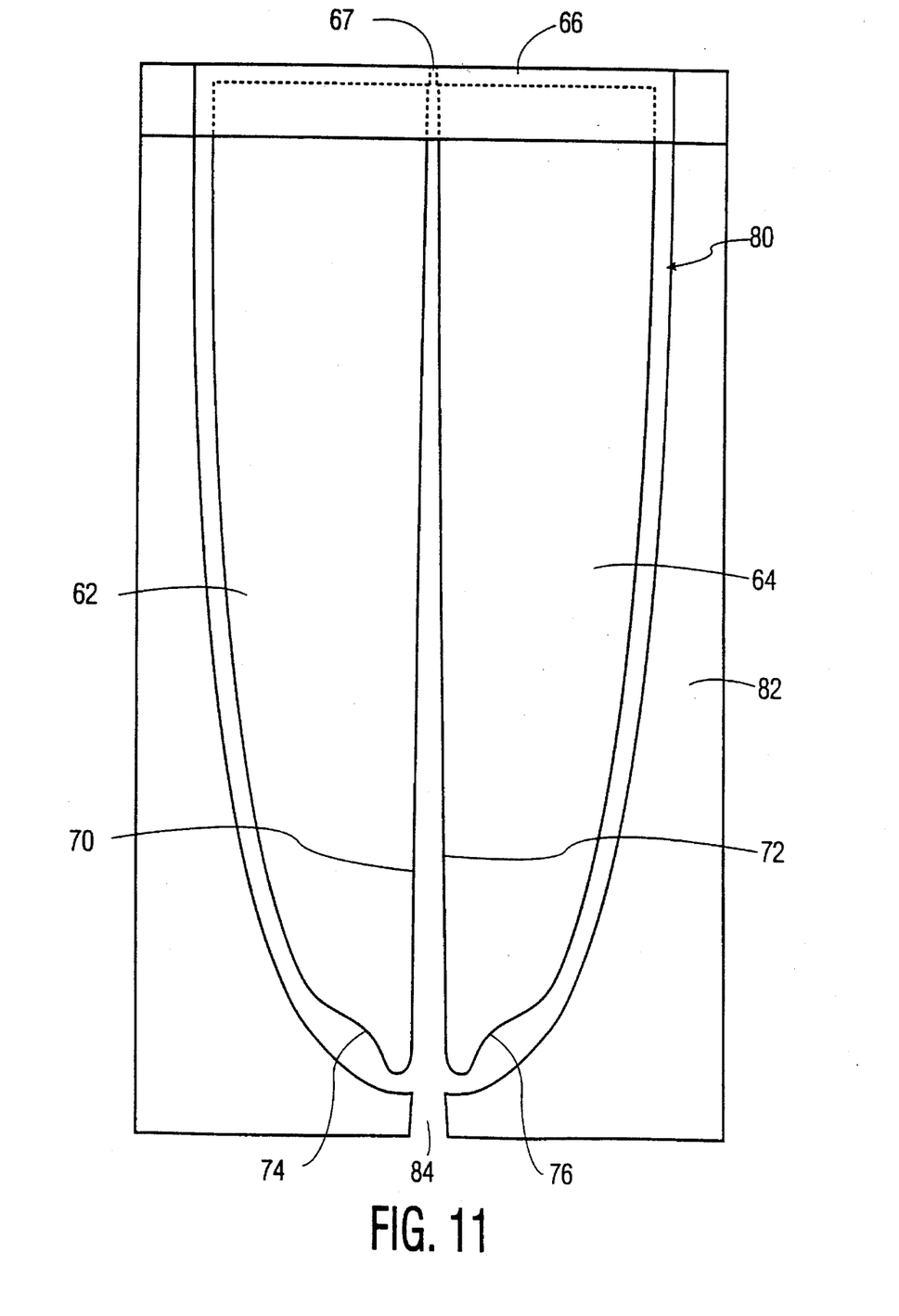
FIG. 11 is an elevational view in section of the injection mold for making preforms.
Figure 12:
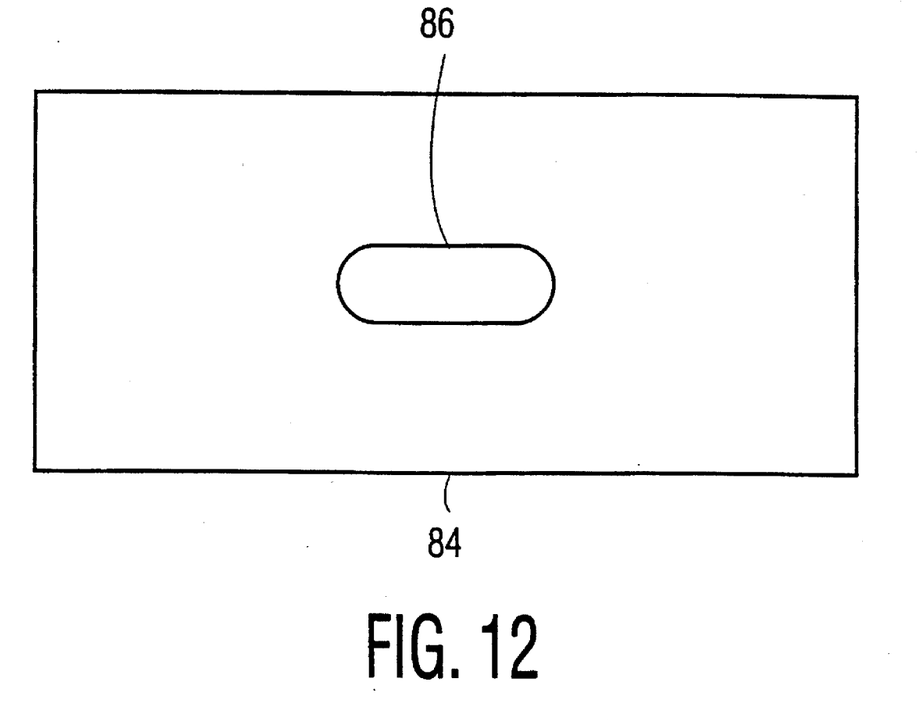
FIG. 12 is a bottom view of the injection mold of FIG. 11 with an elongated gate pad.
Figure 13:
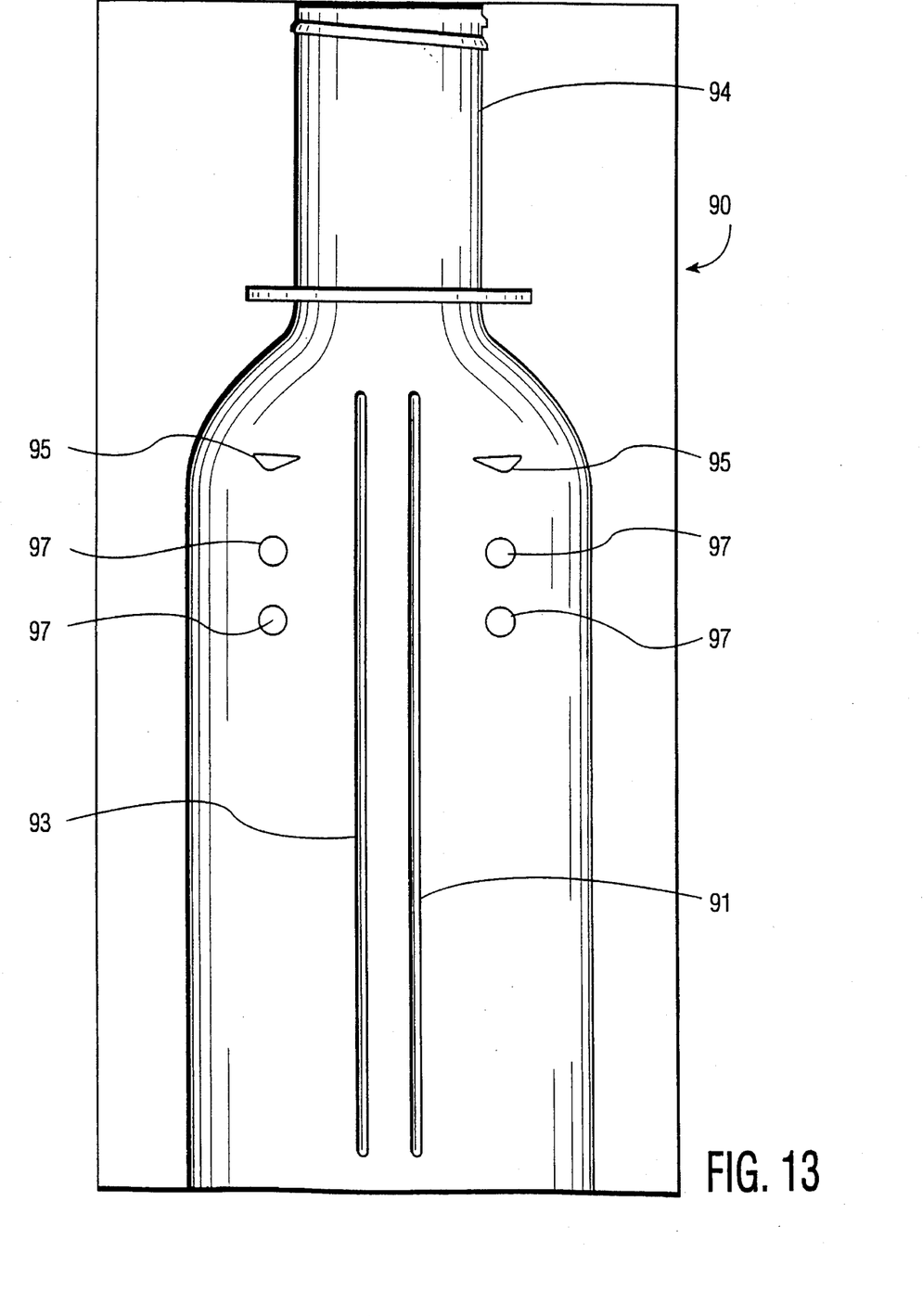
FIG. 13 is an inner surface of a blow mold showing recesses and projections to promote a vertical downward flow of plastic during blow molding.

FIG. 10 shows the core mold for making the preform. The core mold 60 is comprised of three parts. These are core base 66 and core projections 62 and 64 center void space 68 will produce the inner wall of the preform. In a preferred embodiment surfaces 70 and 72 are recessed at the lower end to produce recesses 74 and 76. FIG. 11 shows core mold 60 in the injection mold 80. This consists of mold body 82 and gate 84. A gate pad covers part of gate 84 and regulates the flow of plastic during injection molding. Injection mold 80 is vented at 67 at the top of inner wall 56. FIG. 12 shows gate pad 84 with an elongated aperture 86. The objective in FIG. 12 is to use a gate pad which will allow for the flow of plastic to control the deflection of the core projections during injection molding. It also is an objective to control any movement of core projections 62 and 64 and thus produce a uniform preform. This control can also be achieved through the use of recesses 74 and 76 and a gate pad with a circular aperture. This control is increased by the use of recesses 74 and 76 in combination with an elongated aperture. A preform that is out of specification will produce a bottle that is out of specification.

FIG. 14 shows a half section 92 of a blow mold 90 with various recesses 91 and 95 or protrusions 93 and 97. Section 94 forms the dispenser/doser of the container. These features will result in the opposite effect in the blown bottle. The objective of these recesses and projections is to promote a vertical flow of plastic along the blow mold wall during the blow mold process. If the plastic does not flow vertically, but at an angle, there can result a spiraling of the inner wall 56 of the preform as the bottle is being formed.

The preform is formed by heating the plastic so that it flows and applying a melt pressure of about 2000 to 20,000 psi. The useful plastics include polypropylene, polyvinyl chloride, acrylonitrile—styrene or their copolymers, polyethylene terephthalate or copolymers or terpolymers thereof, and polybutylene terephthalate. After being form the preform is placed in a blow mold and with an internal air pressure of about 100 to 1000 psi is blown to the shape of the mold. Preferably the pressure is about 600 psi.

The foregoing description describes the preferred and best mode for practicing the present invention. Modifications to the disclosed embodiments are contemplated to produce particular containers and are considered to be within the scope of the present invention.

An option with regard to the dip tubes is to mold the dip tubes onto the bottle inner wall as the bottle is made and solely then to insert a peal fitment between the dispenser/doser portion. This reduces the number of parts.

A further option is to use a telescoping stretch rod technique in blow molding the containers. A telescoping stretch technique provides advantages in the distribution of the air during blowing. This can produce a container with a more uniform web.

We claim:

1. A plastic blow molded container, said container having sidewalls, a base at one end of said sidewalls with a dispensing means at an other end of said sidewalls to define the body of said container, a dispensing means exit for the removal of substances from said dispensing means, a plurality of separate chambers within said container, each chamber being separate from the base through the dispensing means, continuous webs within said container and extending from said-base to said dispensing means exit separating said container into said plurality of separate chambers, said continuous webs formed along with said container during the blow molding of said container and being of a lesser thickness at about a midpoint region thereof so that said webs flex when said sidewalls of said container are compressed to deliver product from said container body to said dispensing means.

2. A plastic blow molded container as in claim 1 wherein said dispensing means is an integral part of said container and is comprised of an upwardly extending dispensing means sidewall extending from said container sidewall to said dispensing means said dispensing chamber, said dispensing chamber having a cross-sectional area less than that of said container, each of said continuous webs extending to said dispensing means exit to divide said dispensing chamber into a plurality of separate chambers.

3. A plastic blow molded container as in claim 2 wherein within said dispensing means there is at least one dip tube sealably supported in the dispensing means between the dispensing means sidewall and at least one of said webs and extending into said container body to adjacent the base of said container body, the product to be dispensed flowing up said dip tube upon compression of the container sidewalls and the flexing of said webs and being maintained separated by said webs within said dispensing means until flowed therefrom through said dispensing means exit.

4. A plastic blow molded container as in claim 3 wherein each of said dip tubes at a lower end thereof has a irregular surface.

5. A plastic blow molded container as in claim 4 wherein the lower end of each dip tube is V-shaped.

6. A plastic blow molded container as in claim 2 wherein said container has an elliptical cross-section.

7. A plastic blow molded container as in claim 2 wherein said web has the least thickness at a center region thereof.

8. A plastic blow molded container as in claim 7 wherein said web at the center region thereof has a thickness of less than about 0.4 millimeters.

9. A plastic blow molded container as in claim 2 wherein in the sidewalls of said container body there is at least one of a vertical projection and vertical recess alignment means to direct the flow of plastic in a vertical direction during blow molding.

10. A plastic blow molded container as in claim 2 including a closure that is threadedly attached to said dispensing means, said closure having a seal to contact said dispensing means exit, said seal being rotatable with respect to said closure.

11. A plastic blow molded container as in claim 10 wherein there are threads on an exterior surface of said dispensing means adjacent the exit thereof for the attachment of said closure to said container.

12. A plastic blow molded container as in claim 1 wherein at the junction of said sidewalls and said dispensing means there is an outwardly extending flange, said flange having at least one upwardly extending lug to hold a closure in place.

13. A plastic molded container as in claim 12 wherein said flange is an integral part of said container.

14. A plastic blow molded container as in claim 1 wherein said container is constructed of polyethylene terephthalate.

15. A plastic blow molded container as in claim 1 where said container is elliptical in shape with one continuous web traversing the minor dimension of said elliptical shape.

16. A plastic blow molded container, said container having sidewalls, a base at one end of said sidewalls with a dispensing means at an other end of said sidewalls to define the body of said container, a plurality of continuous webs extending from said base to said dispensing means, said webs dividing the body of said container into a plurality of separate chambers, said webs being of a lesser thickness at about a mid-point thereof so that said webs flex when said sidewalls of said container are compressed to deliver product from said container, and an outwardly extending flange at the junction of said sidewalls and said dispensing means, said flange having at least one upwardly extending lug to hold a closure in place.

17. A plastic blow molded container as in claim 16 wherein said dispensing means has an exit end and threads on an exterior surface of said exit end of said dispensing means for the attachment of a closure to said container.

18. A plastic blow molded container as in claim 16 wherein said webs extend into said dispensing means and divide said dispensing means into a plurality of chambers.

19. A plastic blow molded container as in claim 18 wherein said dispensing means has an upwardly extending dispensing means sidewall, dip tubes sealably connecting a chamber in the body of said container with a chamber in said dispensing means for the flow of liquids from said container body to said dispensing means.

* * * * *